Patented Aug. 16, 1949

2,479,158

UNITED STATES PATENT OFFICE 2,479,158

MAGNESIUM TITANATE PHOSPHOR

Herman C. Froelich, Cleveland Heights, Ohio, assignor to General Electric Company, a corporation of New York No Drawing. Application January 17, 1947, Serial No. 722,749

4 Claims. (Cl. 252—301.4)

My invention relates generally to phosphors, that is, fluorescent or phosphorescent materials. More particularly, my invention relates to magnesium titanate phosphor, and it is an object of this invention to provide an improved composition of high brightness, as well as an improved method of compounding and preparing the phosphor. More particularly, it is an object to provide a simple method whereby the phosphor may be prepared by a single firing at comparatively low temperature so that the cost of preparing the phosphor is very substantially less than that involving firing at the usual high temperature. Further objects and advantages of my invention will appear from the following detailed description.

According to the present invention the phosphor is prepared by firing, at 1070° C., a dry mixture of MgO, $TiO_2$, a manganese compound capable of breaking down to furnish MnO, such as $MnCO_3$ or $MnF_2$, and some 10–20% by weight of the total of $AlF_3$. The mixture is obtained by short ball milling or repeated sieving through a fine mesh screen. Within limits, the phosphor is not very sensitive to change in matrix composition. The range of 2–4 mols MgO for one mol $TiO_2$ gave the brightest phosphor. Powders having a ratio of less than 1:1, however, were substantially less bright, while powders with a much higher ratio than 4:1 were also inferior because of dilution by inert MgO. The range of optimum concentration of the MnO activator is narrow; it was found to lie between about .01 and .1% by weight of the total, preferably around .06%. Suitable firing temperatures are from 1000 to 1200° C., preferably 1050 to 1100° C.

A considerable variety of added impurities, including $ZrO_2$, $SnO_2$, $Sb_2O_3$, ZnO, showed little effect. Even relatively large amounts of iron and copper did not impair the brightness unduly. Phosphates, however, proved to be harmful.

The dry method described herein is superior to the wet method which is not only expensive but very troublesome when larger amounts are prepared. The hydrolysis of $TiCl_4$ even in concentrated HCl is strongly exothermic and is accompanied by evolution of large amounts of HCl gas.

To make the phosphor more friable, some beryllium oxide may be incorporated in it. Thus a phosphor made with 2 mols MgO and one mol BeO for one mol $TiO_2$ was of the same brightness, but more friable, as compared with a phosphor having 3 mols of MgO for one mol $TiO_2$.

The following is one specific example for the preparation of this phosphor. 30 grams magnesium oxide and 30 grams $TiO_2$ (both commercial grades of preferably high purity), 9 grams of C. P. aluminum fluoride and .08 grams of manganese fluoride (hydrated, 52% MnO) all of very fine particle size, are sifted 5 times through 100 mesh bolting cloth. The powder mixture is then placed on a silica tray and fired in an electric furnace in air at 1070° C. for one hour. After cooling, crushing and sieving, the phosphor may, if desired, be refired in oxygen at 560° C. for 15 hours. After cooling it is again sifted and is then ready for use.

Analysis of diffraction patterns has shown that high phosphor brightness is associated with the development of the spinel-type orthotitanate compound, $2MgO \times TiO_2$. Brightness is low when the structure of metatitanate $MgO \times TiO_2$ prevails. Metatitanate is produced in mixtures containing only one mol MgO for one mol $TiO_2$. It is also produced when mixtures containing more than one mol MgO react incompletely to give metatitanate plus excess free MgO.

The function of aluminum fluoride is apparently twofold. It acts as a flux, catalyzing the formation of the fluorescent spinel-type orthotitanate, especially in mixtures having at least 2 mols MgO for each mol of $TiO_2$. In addition, however, it also enters the spinel lattice as part of a new complex compound in which Ti and O are partly replaced by Al and F ions. Evidence for this complex titanate is a contraction of the spinel lattice containing incorporated $AlF_3$, as compared with orthotitanate prepared without any $AlF_3$.

The further addition of BeO does not produce any additional lattice changes, indicating that BeO is probably not incorporated within the orthotitanate lattice. It serves, apparently, merely as a diluent, though as a useful one, because it increases the friability of the phosphor.

The phosphor is particularly responsive to longer ultraviolet radiations of, for example, 3650 A. wave length. It fluoresces with a red color, and may be used in conjunction with high pressure mercury vapor electric discharge lamps to supplement the spectrum of such lamps by the addition of red light.

What I claim as new and desire to secure by Letters Patent of the United States is:

1. The method of preparing a magnesium titanate phosphor which comprises firing at a temperature of approximately 1000 to 1200° C. a dry mixture of MgO and $TiO_2$ in proportions of about 2 to 4 mols MgO for 1 mol $TiO_2$, a manganese compound capable of breaking down to furnish MnO in an amount of about .01 to 0.1% by weight, and about 10 to 20% by weight of $AlF_3$.

2. A method of preparing a magnesium titanate phosphor which comprises firing at a temperature of approximately 1000 to 1200° C. a dry mixture of the following ingredients in approximately the proportions stated; 30 grams magnesium oxide, 30 grams titanium oxide, 9 grams aluminum fluoride, and .08 grams manganese fluoride.

3. A fluorescent material consisting of a complex compound of magnesium orthotitanate and aluminum fluoride activated by manganese in an amount of from .01 to 0.1% by weight of MnO, the aluminum fluoride being present in an amount of about 10 to 20% by weight.

4. A fluorescent material consisting of a complex compound of magnesium orthotitanate and aluminum fluoride activated by manganese in an amount of from .01 to 0.1% by weight of MnO, the aluminum fluoride being present in an amount of about 10 to 20% by weight, and the magnesia and titania being present in proportions of about 2 to 4 mols MgO to 1 mol $TiO_2$.

HERMAN C. FROELICH.

REFERENCES CITED

The following references are of record in the file of this patent:

UNITED STATES PATENTS

| Number | Name | Date |
|---|---|---|
| 2,244,558 | Krautz | June 3, 1941 |